United States Patent
Wang et al.

(10) Patent No.: US 9,730,216 B2
(45) Date of Patent: Aug. 8, 2017

(54) METHOD AND SYSTEM FOR ENABLING MULTIPLE TRANSMISSION IN WIRELESS SYSTEMS

(75) Inventors: Jianfeng Wang, Ossining, NY (US); Monisha Ghosh, Chappaqua, NY (US)

(73) Assignee: KONINKLIJKE PHILIPS N.V., Einghoven (NL)

( * ) Notice: Subject to any disclaimer, the term of this patent is extended or adjusted under 35 U.S.C. 154(b) by 323 days.

(21) Appl. No.: 13/808,350

(22) PCT Filed: Jul. 5, 2011

(86) PCT No.: PCT/IB2011/052964
§ 371 (c)(1),
(2), (4) Date: Jan. 4, 2013

(87) PCT Pub. No.: WO2012/004737
PCT Pub. Date: Jan. 12, 2012

(65) Prior Publication Data
US 2013/0114553 A1   May 9, 2013

Related U.S. Application Data

(60) Provisional application No. 61/362,030, filed on Jul. 7, 2010.

(51) Int. Cl.
*H04W 72/04* (2009.01)
*H04W 28/26* (2009.01)
*H04L 5/00* (2006.01)

(52) U.S. Cl.
CPC ....... *H04W 72/0446* (2013.01); *H04W 28/26* (2013.01); *H04L 5/0005* (2013.01)

(58) Field of Classification Search
CPC . H04W 72/0446; H04W 80/00; H04W 72/04; H04W 4/00; H04Q 7/00; H04B 1/40; H04B 1/38; G06F 13/372

(Continued)

(56) References Cited

U.S. PATENT DOCUMENTS

2006/0198353 A1   9/2006   Wason
2008/0137606 A1*  6/2008   Zuniga et al. ............... 370/330
(Continued)

FOREIGN PATENT DOCUMENTS

WO   WO2006111826 A1   10/2006
WO   WO2006120648 A2   11/2006
(Continued)

OTHER PUBLICATIONS

"Standard ECMA-368—High Rate Ultra Wideband PHY and MAC Standard", ECMA 3rd Edition—Dec. 2008.

*Primary Examiner* — Charles C Jiang
*Assistant Examiner* — Wali Butt
(74) *Attorney, Agent, or Firm* — Larry Liberchuk (57) ABSTRACT

A method (900) for medium access reservation in a multi-band wireless network comprises determining available slots (220) for reservation in a superframe (210) for reservation across multiple channels (S910); generating channel reservation protocol (CRP) availability information element (IE) (310) to indicate the available slots on a main channel; generating one or more Extended-Channel CRP availability IEs (500) to indicate the available slots on one or more respective extended channels (S920); exchanging the CRP availability IE and the Extended-Channel CRP availability IEs between a receiving device and a transmitting device (S930); and generating a Multiband CRP IE (600) to reserve slots that are available on the receiving device and the transmitting device (S940).

19 Claims, 6 Drawing Sheets

(58) Field of Classification Search
USPC .................... 725/131; 370/328–336; 455/73; 710/117
See application file for complete search history.

(56) References Cited

U.S. PATENT DOCUMENTS

| | | | |
|---|---|---|---|
| 2008/0232311 A1* | 9/2008 | Reumerman et al. | ........ 370/329 |
| 2008/0259895 A1 | 10/2008 | Habetha | |
| 2009/0036063 A1* | 2/2009 | Zuniga et al. | .................. 455/73 |
| 2009/0322941 A1 | 12/2009 | Hatanaka | |
| 2010/0177718 A1* | 7/2010 | Harle | .................... H04W 72/00 370/329 |
| 2011/0205962 A1* | 8/2011 | Das et al. | ..................... 370/328 |

FOREIGN PATENT DOCUMENTS

| | | |
|---|---|---|
| WO | WO2008070067 A2 | 6/2008 |
| WO | WO2010024784 A1 | 3/2010 |
| WO | WO2010073158 A1 | 7/2010 |

* cited by examiner

METHOD AND SYSTEM FOR ENABLING MULTIPLE TRANSMISSION IN WIRELESS SYSTEMS

The invention generally relates to transmission in wireless systems, and more particularly, to techniques for enabling multiband transmission in such systems.

Figure 1:
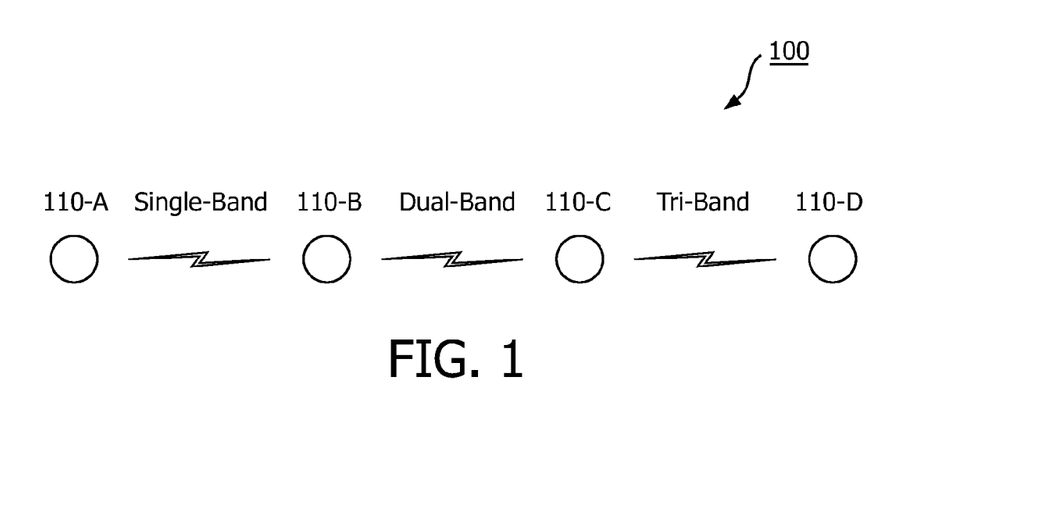
FIG. 1 is a diagram of an exemplary multiband communication system.

A wireless device equipped with a cognitive radio or spectrum-agile radio may communicate with another device through more than one channel, if such channels are available. For example, FIG. 1 illustrates a group of wireless devices in a multiband communication system 100. A device 110-A is a legacy device, a device 110-B is a dual-band capable device, and devices 110-C and 110-D are tri-band devices. The device 110-A can communicate with any device in the system 100 only through a main channel. The device 110-B can receive and transmit signals through two channels, while the devices 110-C and 110-D can transmit and receive signals through three channels. The main channel is a channel on which all devices 110-A through 110-D in the system 100 can communicate.

Figure 2:
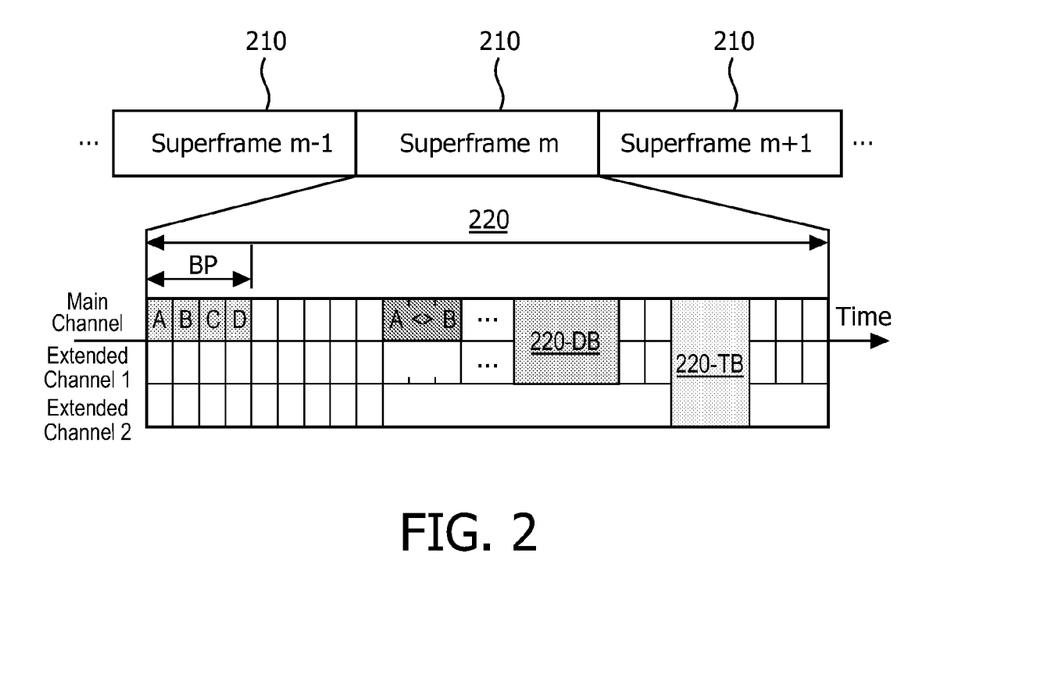
FIG. 2 is an illustration of operation of a slot-based distributed MAC protocol.

Currently-defined medium access control (MAC) protocols allow access through a single channel. An example of such a protocol is a slot-based distributed MAC protocol the operation of which is illustrated in FIG. 2. Each recurring superframe 210 consists of a predefined number of medium access slots (MASs): slots 220. Each slot 220 can be reserved for a contention-free reservation access (CRA) via a channel reservation protocol (CRP) or open for prioritized contention access (PCA) if not reserved.

A wireless device with capabilities to access a slot 220 across multiple adjacent channels may bond these channels together for multiband transmission. As shown in FIG. 2, the group of slots 220-DB are reserved for dual-band communication between devices 110-B and 110-C on a main and first extended channels. The group of slots 220-TB are reserved for tri-band communication between devices 110-C and 110-D on the main, first and second extended channels.

Devices synchronize with each other and negotiate the ownership and use policy of a set of slots 220 via beacons. Beacons are preferably transmitted on the main channel during a beacon period (BP). According to the agreed ownership and the use policy on the slots 220, data communication can be carried on the main channel and extended channels.

Figure 3A:
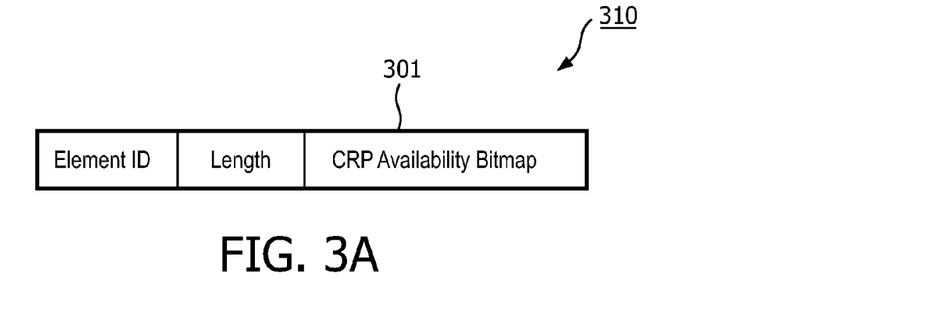
FIG. 3A is an illustration of a CRP Availability IE format.
Figure 3B:
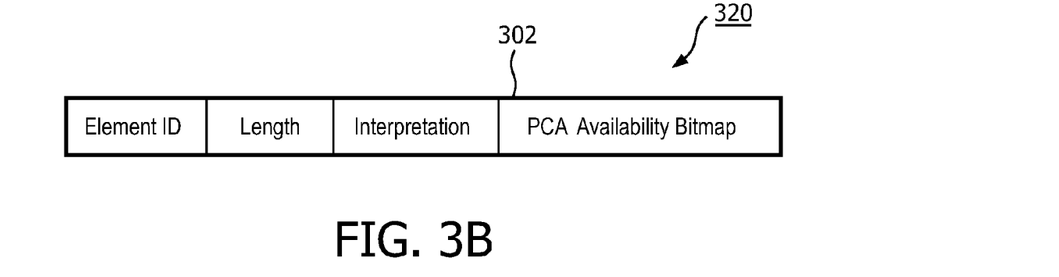
FIG. 3B is an illustration of a PCA Availability IE format.
Figure 4:
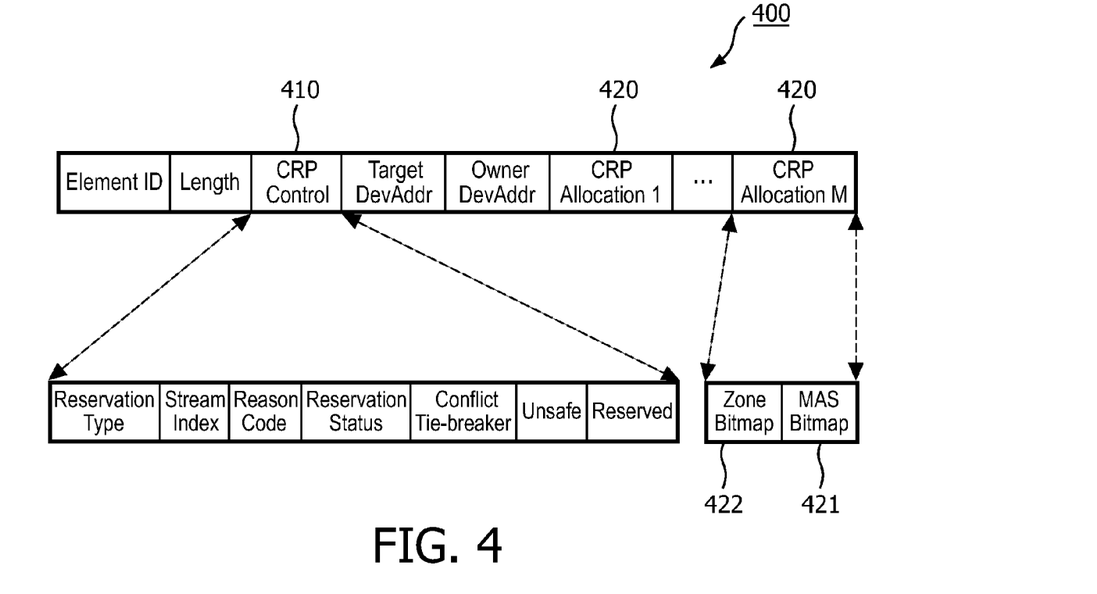
FIG. 4 is an illustration of a CRP IE format.

In order to reserve a slot 220, a device should know the availability of all slots 220 in a superframe 210. In the related art, a mechanism is defined for single-channel based wireless systems. The mechanism generally includes information elements (IEs) for specifying the availability of slots 220. Typically, a CRP Availability IE 310 and PCA Availability IE 320, illustrated in FIGS. 3A and 3B respectively, are utilized for this purpose. With this aim, the IE 310 and 320 respectively include Availability Bitmap fields 301 and 302, each of which consists of bits as the number of slots 220 in a superframe 210, where each bit indicates if a respective slot is available. Specifically, each of the already defined Availability Bitmap fields 301 and 302 include 256 bits, one bit for each slot 220 in the superframe 210. The least-significant bit usually corresponds to the first slot in the superframe and successive bits correspond to successive slots. Each bit is set to '1' if the device is available in the corresponding slot, or is set to '0' otherwise. In addition, if the length of the Availability Bitmap field (either 301 or 302) is smaller than 32 octets, the bits in octets not included at the end of the bitmap are treated as '0'. If a set of slots 220 is available for reservation, a CRP IE is used to negotiate the reservation or part of a reservation for certain slots 220 and to announce the reserved slots. An exemplary format of a CRP IE 400 is depicted in FIG. 4. Among other fields, the CRP IE 400 includes a CRP control field 410 and a number of M (where M is an integer number greater than 1) CRP allocation fields 420. The CRP control field 410 defines the status and policy set for a reservation. A CRP allocation field 420 includes a MAS Bitmap field 421 and Zone Bitmap field 422 that identifies the zones that contain reserved slots. If a bit in the field 422 is set to a logic value '1', the corresponding zone contains reserved slots 220 and a zero bit corresponds to zone zero. The MAS Bitmap 421 specifies which slots 220 in the zones identified by the Zone Bitmap field 422 are parts of the reservation. If a bit in the MAS Bitmap 421 is set to a logic value '1', the corresponding slot 220 within each zone identified by the Zone Bitmap 422 is included in the reservation.

As can be understood from the above discussion, the CRP IE 400 can be used only in a single-channel system. The slot-based distributed MAC protocol does not define any provisioning and data structure format that can be utilized in a system where the negotiation of the ownership and the use policy of slots are performed in the main channel while data communication can be scheduled on multiple channels. Therefore, current MAC protocols do not enable multiband transmission in wireless systems.

Certain embodiments of the invention include a method for medium access reservation in a multiband wireless network. The method comprises determining available slots for reservation in a superframe for reservation across multiple channels; generating channel reservation protocol (CRP) availability information element (IE) to indicate the available slots on a main channel and one or more Extended-Channel CRP availability IEs to indicate the available slots on one more respective extended channels; exchanging the CRP availability IE and the Extended-Channel CRP availability IEs between a receiving device and a transmitting device; and generating a Multiband CRP IE to reserve slots that are available both on the receiving device and the transmitting device.

Certain embodiments of the invention also include a multiband wireless device. The device comprises at least one antenna for transmitting and receiving signals on multiple different channels; a radio frequency (RF) frontend connected to the multiple antennas; a physical layer module for identifying on which channels signals are received and on which channels signals are transmitted; and a medium access control (MAC) layer module for controlling an access to the medium across multiple channels by reserving slots in a superframe using a contention-free reservation access (CRA).

The subject matter that is regarded as the invention is particularly pointed out and distinctly claimed in the claims at the conclusion of the specification. The foregoing and other features and advantages of the invention will be apparent from the following detailed description taken in conjunction with the accompanying drawings.

It is important to note that the embodiments disclosed are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Various embodiments of the invention include a method and data structures that enable multiband transmission in wireless networks. According to certain aspects of the invention, medium access time slots can be reserved on one more channels for a contention-free reservation access or a prioritized contention access. Certain embodiments are applicable for wireless systems that support multi-band communication. That is, at least two or more devices in the wireless system should be capable to receive and transmit signals in more than one band. Examples of such systems include, but are not limited to, wireless personal area networks (WPANs) compliant with cognitive radio standards, e.g., Ecma 392, ultra-wide band standards, e.g., Ecma 368, and High Rate 60 GHz standards, e.g., Ecma 387. Certain embodiments can also be implemented in Wi-Fi based wireless systems that operate in a distributed MAC mode.

Figure 5:
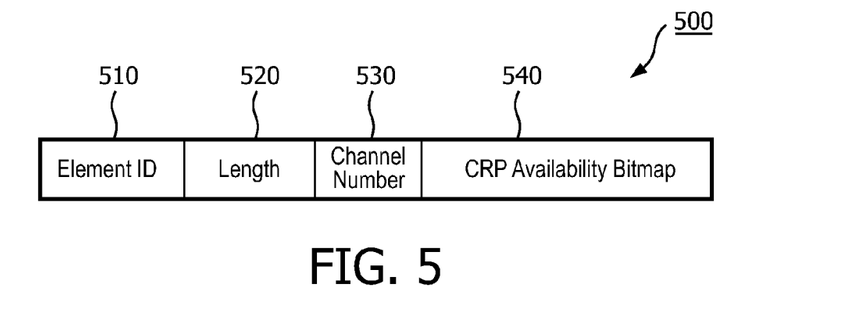
FIG. 5 is an illustration of an Extended-Channel CRP Availability IE format in accordance with an embodiment of the invention.

FIG. 5 depicts a format of an Extended-Channel CRP Availability IE 500. The IE 500 includes the following fields: an element identifier (ID) 510, a length 520 for designating the length of the IE 500, a channel number 530, and a CRP availability Bitmap 540. The channel number field 530 designates an absolute number (or an offset number) of an extended channel on which slots reservation is required. An extended channel is any other available channel in the wireless system, other than the main channel.

The Bitmap field 540 consists of bits as the number of slots (e.g., slots 220) in a superframe (e.g., superframe 210), where each bit indicates whether a respective slot is available on the extended channel. The Extended-Channel CRP Availability IE 500 is generated per each available extended-channel and is transmitted on the main channel in a beacon or part of a command frame. To allow backward compatibility and to announce CRP availability for the main channel, a CRP Availability IE 310 (shown in FIG. 3A) is also transmitted on the main channel in a beacon or part of a command frame.

It should be appreciated that the use of the main channel to exchange the legacy CRP availability IE 310 and one or more Extended-channel CRP availability IEs 500 allow two heterogeneous devices to interoperate with each other. For example, a legacy single-band device (e.g., device 110-A) can interoperate with a tri-band device (e.g., device 110-D).

Similarly, a dual-band device (e.g., a device 110-B) can interoperate with a tri-band device. It should be noted that a multi-band device may transmit one or more IEs 500, one per extended channel, in its beacon or command frame.

Figure 6:
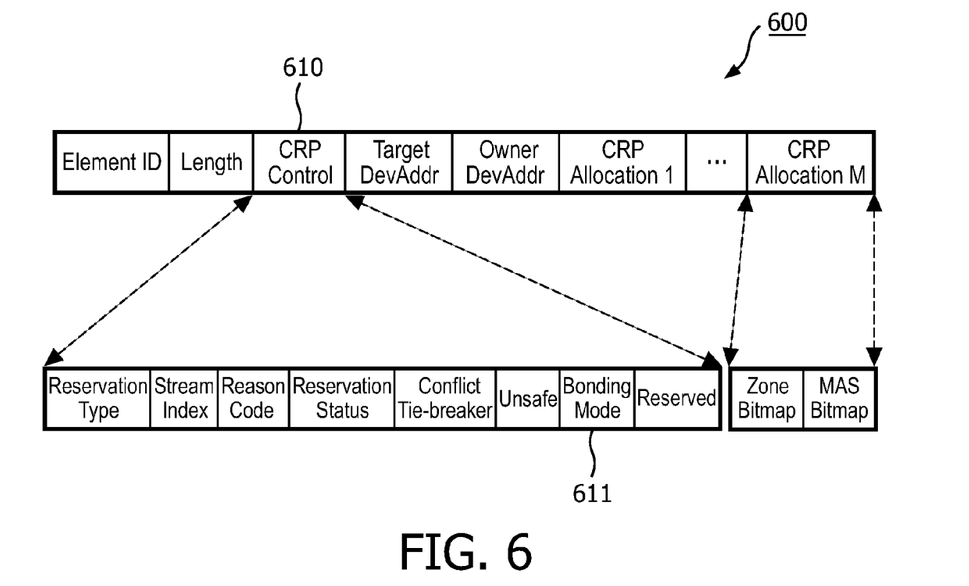
FIG. 6 is an illustration of a Multiband CRP IE format in accordance with an embodiment of the invention.

The CRP availability IEs 310 and 500 provide guidance for further channel reservation. That is, a slot can be reserved for transmission on each and every channel where the slot is available. For example, if a slot is available only on the main channel, the slot can be reserved only for the single-band transmission. If a slot is available on both the main and first extended channels, then it can be reserved for dual-band transmission. In a similar fashion, if a slot is available on the main, first extended, and second extended channels, it can be reserved for tri-band transmission. In accordance with an embodiment of the invention, a reservation or a part of a reservation for certain slots are negotiated between devices using a Multi-band CRP IE 600. The IE 600 is also utilized to announce the ownership and the transmission mode of the reserved slots.

The IE 600 is based on the legacy CRP IE 400 and shown in FIG. 6. The CPR control field 610 is modified to include a bonding mode sub-field 611 to negotiate and announce the transmission mode. In an exemplary embodiment, the bonding mode sub-field 611 includes two bits encoded as illustrated in Table 1. If the bonding mode bits are set to 00, it indicates a single-band transmission on the main channel. If bonding mode bits are set to 01, it indicates a dual-band transmission on the main channel and the first extended channel. Similarly, if the bonding mode bits are set to 10, it indicates tri-band transmission on the main channel, the first extended channel, and the second extended channel.

TABLE 1

| Bonding Mode Bits Values | Transmission type |
| --- | --- |
| 00 | Single-band |
| 01 | Dual-band |
| 10 | Tri-band |
| 11 | reserved |

Figure 7:
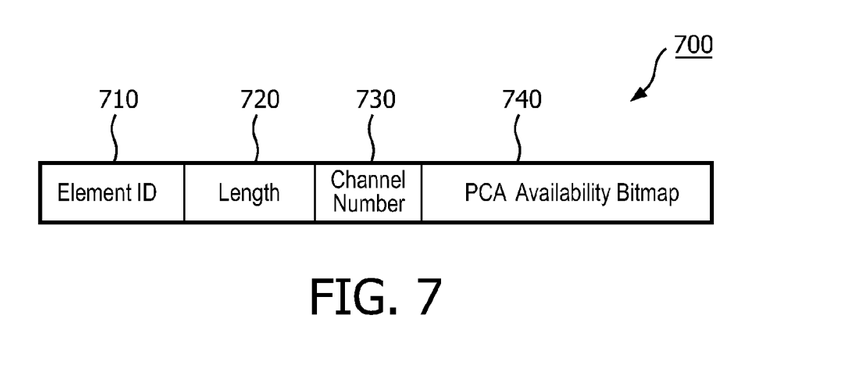
FIG. 7 is an illustration of an Extended-Channel PCA Availability IE format in accordance with an embodiment of the invention.

FIG. 7 depicts a format of an Extended-Channel PCA Availability IE 700. The IE 700 includes the following fields: an element identifier (ID) 710, a length 720 for designating the length of the IE 700, a channel number 730, and a PCA availability Bitmap 740. The channel number field 730 designates an absolute number (or an offset number) of an extended channel for which the IE 700 is generated. The Bitmap field 740 consists of bits as the number of slots (e.g., slots 220) in a superframe (e.g., superframe 210), where each bit indicates if a respective slot is available to receive PCA traffic and transmit the required response in the corresponding slot on the extended channel.

The Extended-Channel PCA Availability IE 700 is generated per each available extended-channel and is transmitted on the main channel in a beacon or part of a command frame. To allow backward compatibility and to announce PCA availability for the main channel, a PCA Availability IE 320 (shown in FIG. 3A) is also transmitted on the main channel in a beacon or part of a command frame. Similar to the CRP availability IEs, the combined use of legacy PCA availability IE 320 and one or more Extended-Channel PCA availability IEs 700 allow two heterogeneous devices to interoperate with each other.

Figure 8:
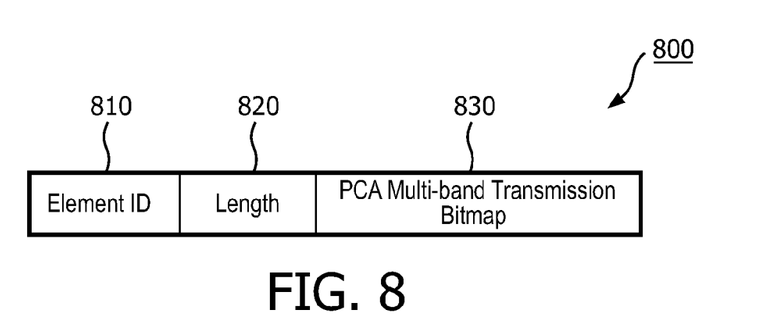
FIG. 8 is an illustration of a Multiband PCA IE format in accordance with an embodiment of the invention.

FIG. 8 illustrates a Multiband PCA IE 800 utilized to facilitate multi-band transmission using PCA in accordance with an embodiment. The PCA IE 800 includes the following fields: an element ID 810, a length 820 for designating the total length of IE 800, and a PCA Multi-band Transmission Bitmap field 830. The field 830 includes r*s bits, where 's' is the number of slots in each superframe and 'r' is an integer number greater than one. In accordance with one embodiment, the value of the parameter 'r' may be equal to 2 and the field 830 is 512 bits long. According to this embodiment, the least-significant two bits of the field 830 correspond to the first slot in the superframe and successive bits correspond to successive slot. Each two bits in the field 830 are encoded to represent the transmission mode allowed on the respective time slot, e.g., main channel, dual-band, and tri-band. Table 2 shows exemplary encoding values for each two bits corresponding to a slot in a superframe. If the value of 's' is less than the total number of slots (e.g., 256) in a superframe, the bits not included at the end of the field 830 are treated as '0'.

TABLE 2

| Bits Values | PCA Transmission Type |
| --- | --- |
| 00 | Not allowed |
| 01 | Single-band |
| 10 | Dual-band |
| 11 | Tri-band |

Figure 9:
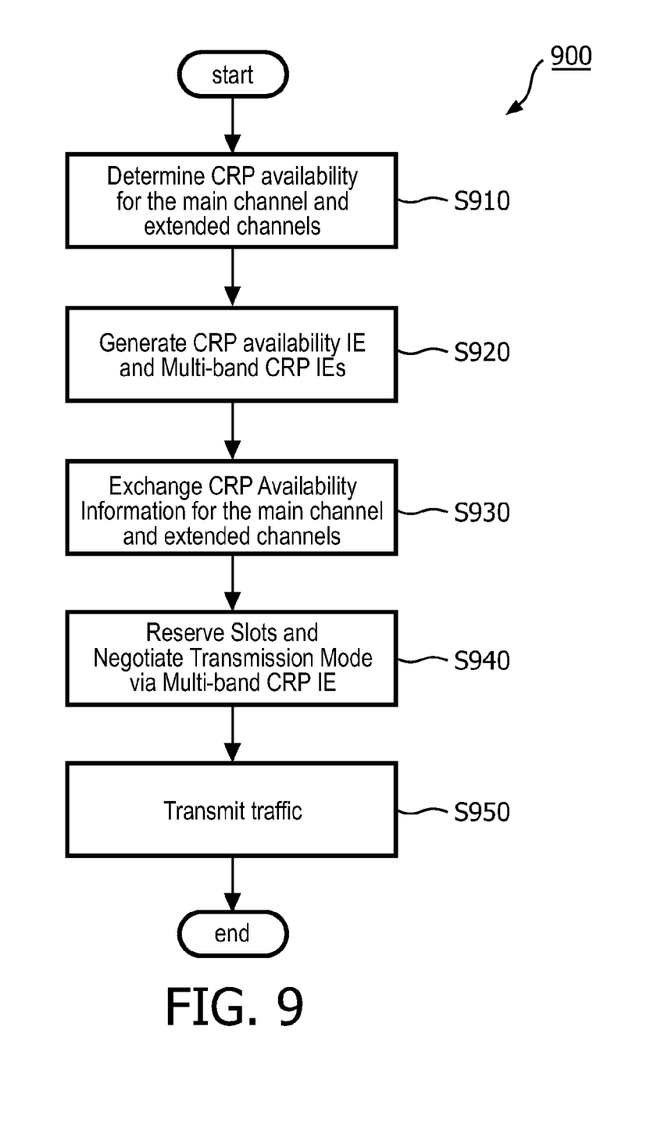
FIG. 9 is a flowchart describing a method for establishing CRA in a multiband wireless network in accordance with an embodiment of the invention.

FIG. 9 shows a non-limiting and exemplary flowchart 900 describing a method for establishing contention-free reservation access (CRA) in a multiband wireless network. The method is executed by a device having multiband transmission capabilities, where data is transmitted in multiple channels to a receiving device with multiband capabilities.

At S910, the slots available in a superframe for reservation across multiple channels are determined. At S920, a CRP availability IE (e.g., IE 310) and one or more Extended-Channel CRP availability IEs (e.g., IE 500) are generated to indicate the available slots on the main channel and each extended channel that the receiving device supports. Such IEs may also be generated by the transmitting device. At S930, the generated IEs are exchanged between the transmitting device and receiving device. At S940, the transmitting device generates a Multiband CRP IE (e.g., IE 600) to reserve slots that are available both on the receiving and transmitting devices and to announce the transmission mode. For example, if the receiving and transmitting devices are dual-band devices, then the bonding mode field will be set to a value of '01' indicating a dual-band transmission. The MAS bitmap in IE 600 will be set to indicate a group of slots reserved on the main and first extended channels, for example, group of slots 220-DB, shown in FIG. 2. It should be noted that IEs 310, 500, and 600 are transmitted on the main channel. At S950, data is transmitted on the reserved slots on multiple channels according to an agreed transmission mode and policy.

Figure 10:
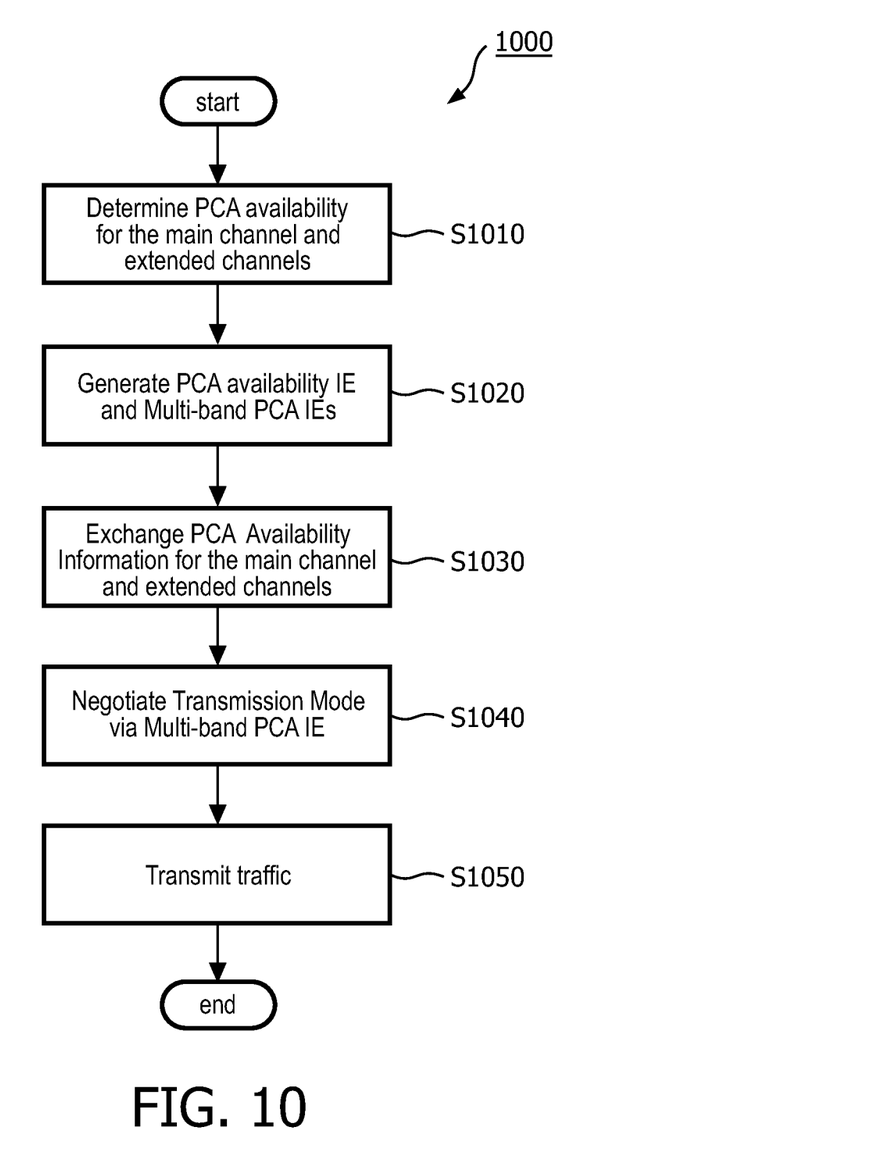
FIG. 10 is a flowchart describing a method for establishing PCA in a multiband wireless network in accordance with an embodiment of the invention.

Unreserved slots can be utilized for transmission of PCA traffic. A non-limiting and exemplary flowchart 1000 of a method for establishing prioritized contention access (PCA) is depicted in FIG. 10. The method is executed by a device having multiband transmission capabilities, where data is transmitted on multiple channels to a receiving device with multiband capabilities.

At S1010, the slots available in a superframe for PCA across multiple channels are determined. At S1020, a PCA availability IE (e.g., IE 320) and one or more Extended-Channel PCA availability IEs (e.g., IE 700) are generated to indicate the available slots on the main channel and each extended channel that the receiving device supports. Such IEs may also be generated by the transmitting device. At S1030, the generated IEs are exchanged between the transmitting device and receiving device. At S1040, the transmitting device generates a Multiband PCA IE (e.g., IE 800) to negotiate the transmission mode with the receiving device. For example, if the receiving and transmitting devices are dual-band devices, then each two-bits in the PCA Multiband Transmission Bitmap 830 corresponding to an available slot is set to a value of '10' (see Table 2) indicating a dual-band transmission. It should be noted that IEs 320, 700 and 800 are transmitted on the main channel. At S1050, data is transmitted on available and unreserved slots according to an agreed transmission mode and policy.

Figure 11:
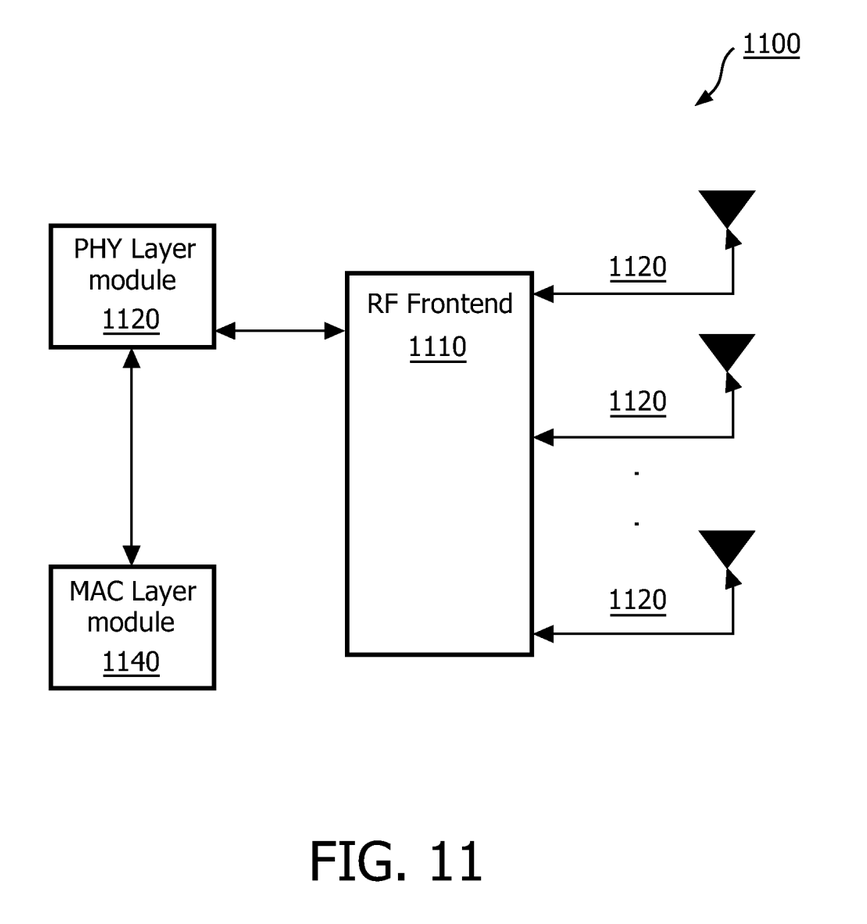
FIG. 11 is a block diagram of a multiband wireless device in accordance with an embodiment of the invention.

FIG. 11 shows an exemplary and non-limiting block diagram of a multiband wireless device 1100. The wireless device 1100 includes a radio frequency (RF) frontend 1110 connected to multiple antennas 1120 for transmitting and receiving signals on different channels, each channel operating in a different frequency band. The wireless device 1100 also includes a physical (PHY) layer module 1130 and a MAC layer module 1140. The PHY layer module 1130, in addition to performing typical PHY layer operations for interfacing with a wireless medium, identifies on which channels signals are received and on which channels signals are transmitted. The MAC layer module 1140 generates the IEs described in detail above and controls the access to the medium by establishing contention-free reservation access (CRA) and/or prioritized contention access (PCA) as described in detail above.

The principles of various embodiments of the invention can be implemented as hardware, firmware, software or any combination thereof. Moreover, the software is preferably implemented as an application program tangibly embodied on a program storage unit, a non-transitory computer readable medium, or a non-transitory machine-readable storage medium that can be in a form of a digital circuit, an analogy circuit, a magnetic medium, or combination thereof. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

The foregoing detailed description has set forth a few of the many forms that the invention can take. It is intended that the foregoing detailed description be understood as an illustration of selected forms that the invention can take and not as a limitation to the definition of the invention. It is only the claims, including all equivalents that are intended to define the scope of this invention.

The invention claimed is:
1. A method for medium access reservation in a multiband wireless network, comprising:
 determining available slots for reservation in a superframe for reservation across multiple channels;
 generating channel reservation protocol, CRP, availability information element, IE, to indicate the available slots on a main channel;

generating one or more Extended-Channel CRP availability IEs to indicate the available slots on one or more respective extended channels;

exchanging, over a main channel, the CRP availability IE and the Extended-Channel CRP availability IEs between a receiving device and a transmitting device, wherein the main channel is a communication channel on which all devices can communicate in a single-channel configuration and a multiband configuration; and generating a Multiband CRP IE to reserve slots that are available on the receiving device and the transmitting device, wherein the Multiband CRP IE is configured for negotiation, between the transmitting device and the receiving device, for the reserved slots based on the generated CRP availability IE and Extended-Channel CRP availability IEs.

2. The method of claim 1, wherein the CRP availability IE and the Extended-Channel CRP availability IEs are exchanged on the main channel using any one of a beacon and a command frame.

3. The method of claim 1, wherein an Extended-Channel CRP availability IE includes an element ID field, a length field for designating the length of the Extended-Channel CRP availability IE, a channel number field for designating a channel of an extended channel on which a reservation is targeted, and a CRP availability Bitmap field for designating the available slots.

4. The method of claim 1, wherein the Multiband CRP IE is further utilized to announce ownership of the reserved slots.

5. The method of claim 4, wherein the Multiband CRP IE is further utilized to announce a transmission mode of the reserved slots.

6. The method of claim 5, wherein the Multiband CRP IE comprises at least a bonding mode sub-field being encoded to indicate the transmission mode.

7. The method of claim 5, wherein the transmission mode includes at least one of: a single-band transmission on the main channel, a dual-band transmission on the main channel and a first extended channel, and a tri-band transmission on the main channel, the first extended channel, and a second extended channel.

8. The method of claim 1, further comprising establishing prioritized contention access, PCA, for unreserved slots in the superframe.

9. The method of claim 8, further comprising:

determining available slots for PCA across multiple channels;

generating PCA availability IE to indicate the available slots on a main channel;

generating one or more Extended-Channel PCA availability IEs to indicate the available slots on one or more respective extended channels;

exchanging, over the main channel, the PCA availability IE and the Extended-Channel PCA availability IEs between the receiving device and the transmitting device; and generating a Multiband PCA IE to negotiate a transmission mode between the transmitting device and the receiving device based on the generated PCA availability IE and Extended-Channel PCA availability IEs.

10. The method of claim 9, wherein an Extended-Channel PCA availability IE includes an element ID field, a length field for designating the length of the Extended-Channel PCA availability IE, a channel number field for designating a channel number of an extended channel for which Extended-Channel PCA availability IE is generated, and a PCA availability Bitmap field for designating unreserved slots that can be utilized for data transmission via PCA.

11. The method of claim 9, wherein the Multiband PCA IE includes an element ID field, a length field for designating a total length of the Multiband PCA IE, and a PCA Multiband Transmission Bitmap field including r*s bits, wherein 's' is a number of slots in the superframe and 'r' is an integer number greater than one, wherein each 'r' bits are encoded to designate the transmission mode of a respective slot.

12. The method of claim 9, wherein the PCA availability IE and the Extended-Channel PCA availability IEs are transmitted on the main channel using either a beacon or a command frame.

13. A non-transitory computer readable medium having stored thereon instructions for causing one or more processing units to execute the method according to claim 1.

14. A multiband wireless device comprising:

at least one antenna for transmitting and receiving signals on multiple different channels;

a radio frequency, RF, frontend connected to the at least one antenna;

a physical layer module for identifying on which channels signals are received and on which channels signals are transmitted;

a medium access control, MAC, layer module for controlling an access to the medium across multiple channels by reserving slots in a superframe using a contention-free reservation access, CRA; and a processing circuit configured to:

determine available slots for reservation in a superframe for reservation across multiple channels;

generate channel reservation protocol, CRP, availability information element, IE, to indicate the available slots on a main channel;

generate one or more Extended-Channel CRP availability IEs to indicate the available slots on one or more respective extended channels;

exchange, over a main channel, the CRP availability IE and the Extended-Channel CRP availability IEs between a receiving device and a transmitting device, wherein the main channel is a communication channel on which all devices can communicate in a single-channel configuration and a multiband configuration; and generate a Multiband CRP IE to reserve slots that are available on the receiving device and the transmitting device, wherein the Multiband CRP IE is configured for negotiation, between the transmitting device and the receiving device, for the reserved slots based on the generated CRP availability IE and Extended-Channel CRP availability IEs.

15. The multiband wireless device of claim 14, wherein the MAC layer module further establishes a prioritized contention access (PCA) for unreserved slots in the superframe.

16. The multiband wireless device of claim 14, wherein the Multiband CRP IE is further utilized to announce ownership of the reserved slots.

17. The multiband wireless device of claim 16, wherein the Multiband CRP IE is further utilized to announce a transmission mode of the reserved slots.

18. The multiband wireless device of claim 17, wherein the Multiband CRP IE comprises at least a bonding mode sub-field being encoded to indicate the transmission mode.

19. The multiband wireless device of claim 14, wherein an Extended-Channel CRP availability IE includes an element ID field, a length field for designating the length of the Extended-Channel CRP availability IE, a channel number field for designating a channel of an extended channel on which a reservation is targeted, and a CRP availability Bitmap field for designating the available slots.

* * * * *